United States Patent
Yokota 4,173,396
Nov. 6, 1979

[54] COPYING LENS

[75] Inventor: Minoru Yokota, Hachioji, Japan

[73] Assignee: Konishiroku Photo Industry Co., Ltd., Tokyo, Japan

[21] Appl. No.: 907,344

[22] Filed: May 18, 1978

[30] Foreign Application Priority Data

May 31, 1977 [JP] Japan .................. 52/62744

[51] Int. Cl.² ............................ G02B 9/60
[52] U.S. Cl. ................................ 350/216
[58] Field of Search .................. 350/216, 176

[56] References Cited
U.S. PATENT DOCUMENTS

| | | | |
|---|---|---|---|
| 2,338,614 | 1/1944 | Aklin | 350/221 |
| 2,430,150 | 11/1947 | Warmisham | 350/216 X |
| 3,133,983 | 5/1964 | Rickless et al. | 350/216 X |
| 3,609,013 | 9/1971 | Kawazu | 350/220 |
| 3,672,748 | 6/1972 | Doi et al. | 350/220 |

*Primary Examiner*—Paul A. Sacher
*Attorney, Agent, or Firm*—Lane, Aitken & Ziems

[57] ABSTRACT

In a lens system of five groups of five lens elements in which a front group of two lens elements and a back group of two lens elements are symmetrically arranged on either side of a biconvex lens centrally located therebetween, a copying lens characterized in that the lens elements in sequence from the object comprise a first lens having a positive meniscus configuration with its convex surface directed toward an object, the second lens having a biconcave configuration, a third lens having a biconcovex configuration, a fourth lens having a biconcave configuration and a fifth lens having a positive meniscus configuration with its convex surface being directed toward the image and in which the condition $$0.2 f < f_3 < 0.7 f \quad (1)$$

where,
f: overall focal length
$f_3$: focal length of the third lens and the condition $$0.01 f < d_4 \text{ and } d_6 < 0.09 f \quad (2)$$

where
$d_1, d_2, d_3, \ldots d_9$: the thickness of the lenses and air gaps counted in sequence from the object
are fulfilled.

9 Claims, 4 Drawing Figures (A)　　(B)

COPYING LENS

BACKGROUND OF THE INVENTION

(1) Field of the Invention

This invention relates to an improved copying lens for use in copying machines and, more particularly, to an improved copying lens of small size to be used at or near unity magnification.

(2) Description of the Prior Art

In recent years, copying machines have found widespread use. In these machines, compact small-sized symmetrical lens sytems have been increasingly applied and adapted to the copying application with one of the aims being the correction of the various aberrations that occur at or near unity magnification.

In this kind of lens system there are many cases in which an aperture efficiency of about 100% is provided in order to prevent a decrease in the quantity of light at the edge of image plane. Because of this, a lens system design having a large angle of view will require an increased overall lens system length and an increased diameter for the outermost lens elements. Consequently, the manufacturing process for the respective lenses of the lens system becomes more difficult and the costs of the optical glass required to make the larger diameter and the costs associated with a large lens frame increase.

In view of the above, there is a need for a small-size compact means for properly correcting each of the aberrations in a lens system having a relatively wide angle view greater than 50° at or near unity magnification. While various proposals have been made, a satisfactory arrangement had not yet been found.

BRIEF SUMMARY OF THE INVENTION

It is an overall object of the present invention to provide a new and useful copying lens for use in copying equipment and the like.

It is another object of the present invention to provide a new and useful copying lens which, in terms of its performance, has a low F-number, less curvature of field even with a relatively wide angle of view greater than 50° at or near unity magnification, proper correction of coma flare and, further, suitable correction of the various other aberrations.

In addition to these objects, it is a still further object of the present invention to provide a structurally simple lens system and, further, a small-size, less expensive, new and useful copying lens.

Other objects and purposes of the present invention will be apparent from the description of the preferred embodiment of the present invention as shown in the drawings.

BRIEF DESCRIPTION OF THE DRAWINGS

The above description, as well as further objects, features, and advantages of the present invention will be more fully understood by reference to the following description of a presently-preferred but nonetheless illustrative embodiment in accordance with the present invention, when taken in connection with the accompanying drawing, wherein;

In FIG. 4A, the full line curves show the aberration for light at the d-line (587.56 nanometers) while the dashed line curve is for light at the g-line (435.85 nm.).

DESCRIPTION OF THE PREFERRED EMBODIMENT

Figure 1:
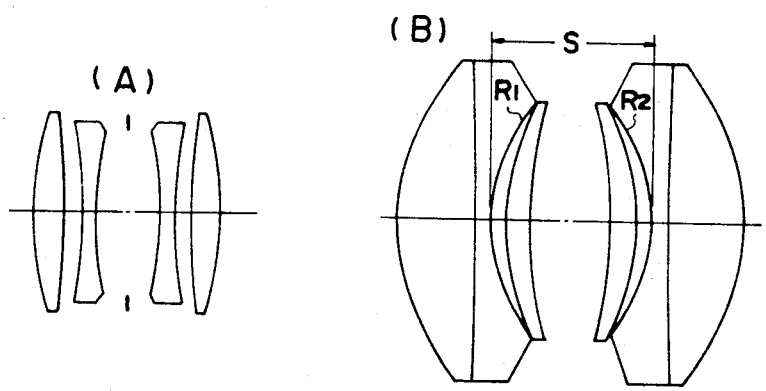
FIGS. 1(A) and (B) illustrate the general structural arrangement of copying lens configurations which are conventionally used in prior art small-size copying lenses.

Two types of conventional small-sized symmetrical lens systems for use in copying machines and the like equipment are shown in FIGS. 1A and 1B. These types of lens systems have, as described below, advantages and deficiencies from the optical standpoint and various practical problems.

Lens systems of the type shown in FIG. 1(A) include four lenses and provide superior performance in a relatively compact form. However, increasing the angle of view to more than 50° at or near unity magnification causes inevitable image defects requiring various corrections for the optical aberrations.

The above defects arise when correcting for the aberrations because optical glass having a high refractive index and a high Abbe-number is required in the case of a positive lens, and, conversely, optical glass having a low refractive index and a low Abbe-number is required in the case of a negative lens thereby decreasing the petzval sum to correct the image field, and, at the same time, correcting the chromatic aberration on the axis. However, due to a practical limitation on optical glass it may be necessary to increase the power of the positive and negative lenses in order to decrease the petzval sum.

In this case, the petzval sum will decrease as a result of increasing the power of the negative lens, and, in turn, both the spherical aberration and the coma flare will increase. Also, increasing of the power will frequently cause many cases in which the shape of the outside positive lens conforms to a biconvex lens, and there may be some problems caused by a difference between the axis and outside the axis, causing the meridional image curvature outside the axis to rapidly become under corrected.

Due to this fact, it is difficult to design a symmetrical lens system having a wide angle of view.

Next, in a lens system of the type shown in FIG. 1(B), it is possible to have a superior correction for each of the aberrations even when a relatively bright and a wide angle of view greater than 50° at or near unity magnification is provided. Thus, this type of lens system provides a superior lens which has found widespread use.

However, the costs associated with the fabrication of lenses of this type are increased because there are six lens elements, the full or overall length of the lens elements is 0.4 times the focal length, and the outer diameter of almost of all the lens elements is greater than 0.3 times the focal length.

One reason why the full or overall length of the lens system of this type is not shortened is because cemented lenses are arranged in both front and back groups. When the radii of curvature at a plane in which a negative lens portion of the cemented lenses is contacted with the air are $R_1$ and $R_2$, respectively, and the space between a back surface of the cemented lens of the front group and a front surface of the cemented lens of back group is S, the value of the S, $R_1$ and $R_2$ are suitably adjusted to make a balance in the aberrations, but it is not possible to provide an extremely low value of S.

That is, when the value of S is decreased and the value of $R_1$ and $R_2$ are decreased, the image field is over corrected and, at the same time, the extreme decrease in values of $R_1$ and $R_2$ will cause overflare and thus it is not possible to make a light lens system having a wide angle of view.

In the case where only the value of S is decreased, the overall image surface is over corrected. When the surface of another one of the lenses, a lens thickness or spacing, etc., is changed to correct this condition by providing under correction, it is the ordinary practice to provide a steep bend in the meridional image plane at a high image height away from the axis. Thus it is not possible to have a lens system having a large angle of view.

Figures 2, 3:
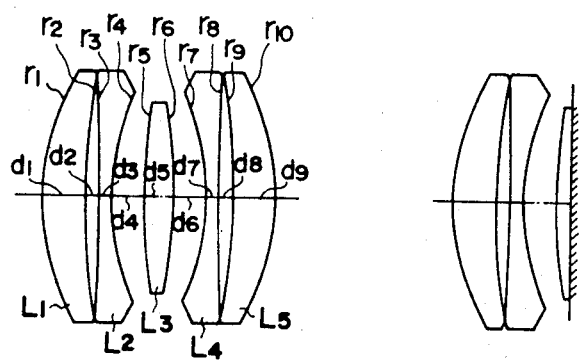
FIG. 2 is a structural view of the preferred basic lens system of the present invention for use in a small-size copying lens.
FIG. 3 is a structural view to the alternatives of basic lens system shown in FIG. 2.
Figures 4A, 4B:
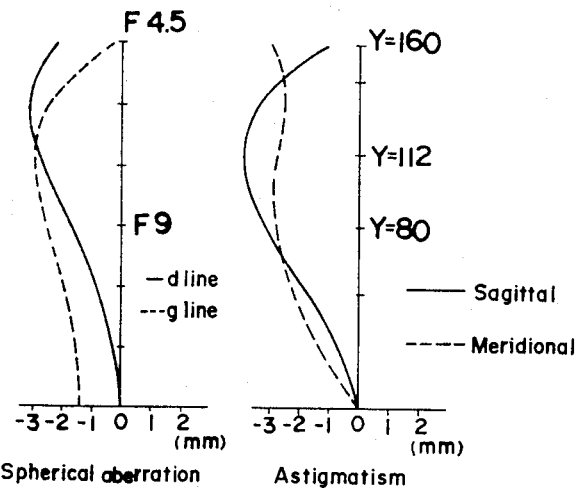
FIGS. 4(A), (B) and (C) are, respectively, spherical, astigmatism, and meridional coma aberration curves of a first embodiment of a small copying lens of the present invention.
In FIG. 4B, the full and dashed lines show sagittal and meridional performance, respectively, and in FIG. 4C, the full and dashed line curves represent light at the d-line and the g-line, respectively. The respective curves, given for values of Y=160, 112, and 80 1 mm, represent 100, 70, and 50%, respectively, of the entire image height.
Figure 4C:
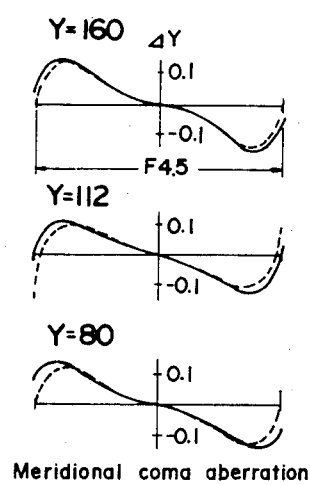

The present invention is suitable for use in a small type copying lenses at or near unity magnification. As shown in FIG. 2, the present invention comprises five groups of five lens elements, which is fewer than that of the lens system shown FIG. 1(B), and in further, comprises an improved lens system having five groups of five lens elements with symmetrical two-lens front and back groups and a biconvex lens arranged in the center between the two groups wherein each of the lens elements is designated in sequence from the object by a first lens $L_1$, a second lens $L_2$, a third lens $L_3$, a fourth lens $L_4$, a fifth lens $L_5$, in which the first lens $L_1$ is a positive meniscus lens with its convex surface directed toward the object, the second lens $L_2$ is a biconcave lens, the third lens $L_3$ is a biconvex lens, the fourth lens, $L_4$ is a biconcave lens and the fifth lens $L_5$ is a positive meniscus lens with its convex surface directed toward the image, and wherein the overall focal length—f
focal length of the third lens—$f_3$
and the following relationship $$0.2\ f < f_3 < 0.7\ f \tag{1}$$

is fulfilled, and the air gaps of five lens elements counted in sequence from the object are $d_1, d_2, d_3, \ldots d_9$, and the condition $$0.01\ f < d_4\ \text{and}\ d_6 < 0.09\ f \tag{2}$$

is fulfilled, thereby providing a copying lens of a new type having a low F-number, wide angle of view, and in which superior correction for each of the aberrations may be made.

An arrangement of the copying lens of the present invention and the necessity of each of the above mentioned conditions will be described below.

The condition (1) is principally applied to correct for spherical aberration and meridional image field.

It is generally known that the spherical aberration may be corrected by increasing the number of the convex lenses or by increasing the refractive index. The present invention utilizes this technical idea and that it is possible to depress generation of the spherical aberration by newly adding the biconvex lens $L_3$ in the center of the four groups of four lens elements of conventional symmetrical lens system of the type shown in FIG. 1(A), it was possible to change the first lens $L_1$ and the fifth lens $L_5$ from a biconvex lens $L_3$ to a positive meniscus lens sharing a portion of the positive power of the first lens $L_1$ and the fifth lens $L_5$ with the third lens $L_3$.

That is, the first lens $L_1$ is a positive meniscus lens with its convex surface directed toward the object, the fifth lens $L_5$ is a positive meniscus lens with its convex surface directed toward the image and thus all the surfaces of the positive lens are made with thinner convex surfaces being directed toward the object and the image. The difference in the generation of aberration on the axis and out of the axis is reduced, a meridional image surface out of the axis is prevented from being under corrected and, thus, it is possible to flatten the image surface.

When the upper limit of the condition (1) is exceeded, the above described correction is decreased and sufficient correction may not be provided.

To the contrary, when the lower limit of the condition (1) is exceeded, the power of the third lens $L_3$ is increased even after the degree of meniscus of the first and fifth lenses $L_1$ and $L_5$ is optimized and if a correction is continued only with the first and fifth lenses $L_1$ and $L_5$, the meridional image surface measured out of the axis becomes over corrected.

However, it may be possible to keep the first and fifth meniscus lenses $L_1$ and $L_5$ at the most suitable value and further provide a correction corresponding to that of the two lenses from the second and fourth lenses $L_2$ and $L_4$, which are biconcave lenses. But, in this case, the increase in the power of the concave lenses having a low refractive index causes an increase of flare, so it is not possible to provide a large aperture lens.

Condition (2), which is to be interpreted as $$0.01f < d_4 < 0.09f$$

and $$0.01f < d_6 < 0.09f,$$

relates to the correction of the astigmatism as described below.

When a symmetrical lens system is used under a unity magnification and an air gap at the central part of the lens system is decreased, there are many cases in which the image surface is over corrected; a similar condition may be found in the lens system of the present invention in which a decrease of air gaps $d_4$ and $d_6$ will over correct the image surface.

This condition occurs because when a flux of light on the axis or out of the axis is passed through the front group of the lens system up to the central, biconvex lens $L_3$ both the heights of the light flux on the axis and out of the axis in the third lens $L_3$ are aligned with each other.

Due to this fact, there is little difference between the heights of the light flux impinged upon the third lens $L_3$ surface, but after passing through the central biconvex lens $L_3$ and entering into the back group concave lens $L_4$ via air gap $d_6$, a difference in height of the light flux impinged upon the concave surface may be varied by changing the length of $d_6$.

That is, a light flux on the axis is hardly varied, but the position in which a light flux out of the axis impinges upon the concave surface moves away from the axis as $d_6$ is shortened and then the image surface out of the axis is over corrected by this concave surface.

Since this lens system is a symmetrical one, a similar relation may be applied to the concave surface of the front group of the lens system and the air gap $d_4$ subsequent to the concave surface.

That is, when the air gaps $d_4$ and $d_6$ are decreased to exceed the lower limit of the condition (2), the entire image surface becomes over corrected.

When an under corrected image surface is returned to the condition by changing the radius of curvature, thickness, space, etc. of the other lens faces without changing the space defined by the air gaps $d_4$ and $d_6$, an intermediate portion of the angle of view will be under corrected at first before a portion having a large angle of view is sufficiently corrected.

That is, the meridional image surface which is obtained when the condition is returned to the under corrected valve under until a proper balance is kept in the image surface becomes over corrected at a part having a large angle of view, and in turn becomes under corrected at a part having a low angle of view, and thereby curvature may be generated in the image surface.

Similar tendency may be found in the sagittal image surface, and in this case approximately ⅓ of variation is found compared to an amount of movement of the meridional image surface and the sagittal image surface does not become over corrected so rapidly as that of the meridional image surface even at a portion having a large angle of view and a large astigmatism is found, thus it is not possible to provide a lens having a large angle of view.

When the upper limit of the condition (2) is exceeded, the meridional image surface becomes under corrected at a portion having a large angle of view and becomes over at a portion having a small angle of view. As described above, when the air gap $d_4$ and $d_6$ are elongated, the height of the light flux out of the axis impinged upon the concave lens becomes low and thus the influence of the flux against the image surface may be decreased. However, when the air gaps $d_4$ and $d_6$ are increased, the full length of the lens system may be increased and thus it is not possible to provide a small-type copying lens for which the present invention applies.

As described above, a copying lens of the present invention, which may be adapted for small size equipment in order to fulfill each of the above conditions, provides superior correction for each of the aberrations and may be provided by an arrangement of five groups of five lens elements even when the full length of the lens system is less than ⅓ of a focal length. A better correction of the image surface may be made by applying the following condition, $$4.95 < n_1 + n_3 + n_5 < 5.25$$

$$3.0 < n_2 + n_4 < 3.3 \quad (3)$$

where, $n_1, n_2, \ldots n_5$ are the refractive indexes against the d-line of the first, second, ... and fifth lenses, respectively.

The condition (3) is a condition in which the curvature of the image surface is to be corrected. An optical glass having a high refractive index is used as a positive lens, an optical glass having a low refractive index is used as a negative lens, and thereby the petzval sum is kept at a low value to prevent the image surface from becoming under corrected.

That is, unless a total amount of refractive index of a positive lens exceeds the lower limit of the condition (3) and a total amount of refractive index of a negative lens exceeds the upper limit of the condition (3), it may be possible to decrease the value of petzval sum and at the same time provide a superior correction for the curvature of the image surface.

It is preferable that the total amount the refractive index of the positive lens not exceed the upper limit of the condition (3), because the expense of the optical glass is increased and the generation of chromatic aberration caused by the positive lens is increased.

To the contrary, when the total amount of refractive index of the negative lens exceeds the lower limit of the condition (3), there is a limitation on the optical glass applicable and thus optical glass having a large Abbe number should be used and thus the effect of correcting the chromatic aberration caused by the positive lens may be decreased.

As to a mirror lens, it is also possible to provide a copying lens for use in small type equipment which fulfills each of the conditions described above which is divided at the center of the lens system into the front and back groups of lens elements and in which the divided surface is formed as a mirror as shown in FIG. 3 in accordance with one embodiment of the present invention.

Practical embodiment of the present invention will now be indicated below.

In these embodiments, the symbols used herein are as follows.

$r_1, r_2, r_3 \ldots r_{10}$: a radius of curvature of lens surface counted in sequence from the object.

$d_1, d_2, d_3, \ldots d_9$: a thickness of the lenses and air gaps counted in sequence from the object.

$n_1, n_2, \ldots n_5$: a refractive index with respect to a line d of the lens counted in sequence from the object.

$\nu_1, \nu_2, \ldots \nu_5$: Abbe number of the lens counted in sequence from the object.

f: a composite focal length of the objective.

$f_3$: a focal length of the third lens.

F: F-number $2\omega$: field angle

Y: image height

| | | Embodiment 1 | | |
|---|---|---|---|---|
| f = 150 | | F 4.5 | $2\omega = 56°$ | Y = 160 |
| $r_1 =$ | 42.701 | $d_1 = 7.08$ | $n_1 = 1.69680$ | $\nu_1 = 55.5$ |
| $r_2 =$ | 102.239 | $d_2 = 2.50$ | | |
| $r_3 =$ | −421.315 | $d_3 = 2.00$ | $n_2 = 1.59551$ | $\nu_2 = 39.2$ |
| $r_4 =$ | 43.423 | $d_4 = 5.57$ | | |
| $r_5 =$ | 93.836 | $d_5 = 5.11$ | $n_3 = 1.74400$ | $\nu_3 = 44.7$ |
| $r_6 =$ | −93.836 | $d_6 = 5.57$ | | |
| $r_7 =$ | −43.423 | $d_7 = 2.00$ | $n_4 = 1.59551$ | $\nu_4 = 39.2$ |
| $r_8 =$ | 421.315 | $d_8 = 2.50$ | | |
| $r_9 =$ | −102.239 | $d_9 = 7.08$ | $n_5 = 1.69680$ | $\nu_5 = 55.5$ |
| $r_{10} =$ | −42.701 | | | |

$f_3 = 63.80$ total length of the lens: 39.41 value of the condition (1): 0.425 f value of the condition (2): 0.037 f value of the condition (3): 5.13 3.19

A constructional view showing the lens of embodiment 1 divided at its center into the front and back groups of lens elements with the divided surface formed as a mirror is illustrated in FIG. 3.

| Embodiment 2 | | | | |
|---|---|---|---|---|
| f = 150 | | F 4.5 | $2\omega = 56°$ | |
| $r_1 =$ | 45.468 | $d_1 = 6.75$ | $n_1 = 1.69680$ | $\nu_1 = 55.5$ |
| $r_2 =$ | 139.884 | $d_2 = 2.60$ | | |
| $r_3 =$ | −297.525 | $d_3 = 2.00$ | $n_2 = 1.59551$ | $\nu_2 = 39.2$ |
| $r_4 =$ | 46.294 | $d_4 = 10.00$ | | |
| $r_5 =$ | 108.311 | $d_5 = 5.93$ | $n_3 = 1.74400$ | $\nu_3 = 44.7$ |
| $r_6 =$ | −108.311 | $d_6 = 10.00$ | | |
| $r_7 =$ | −46.294 | $d_7 = 2.00$ | $n_4 = 1.59551$ | $\nu_4 = 39.2$ |
| $r_8 =$ | 297.525 | $d_8 = 2.60$ | | |
| $r_9 =$ | −139.884 | $d_9 = 6.75$ | $n_5 = 1.69680$ | $\nu_5 = 55.5$ |
| $r_{10} =$ | −45.468 | | | |

$f_3 = 73.65$ total length of the lens: 48.63
value of the condition (1): 0.491 f
value of the condition (2): 0.66 f
value of the condition (3): 5.13  3.19

| Embodiment 3 | | | | |
|---|---|---|---|---|
| f = 150 | | F 4.5 | $2\omega = 56°$ | |
| $r_1 =$ | 46.556 | $d_1 = 9.23$ | $n_1 = 1.69680$ | $\nu_1 = 55.5$ |
| $r_2 =$ | 114.583 | $d_2 = 2.40$ | | |
| $r_3 =$ | −296.458 | $d_3 = 2.00$ | $n_2 = 1.59551$ | $\nu_2 = 39.2$ |
| $r_4 =$ | 46.524 | $d_4 = 4.50$ | | |
| $r_5 =$ | 89.963 | $d_5 = 3.60$ | $n_3 = 1.74400$ | $\nu_3 = 44.7$ |
| $r_6 =$ | −89.963 | $d_6 = 4.50$ | | |
| $r_7 =$ | −46.524 | $d_7 = 2.00$ | $n_4 = 1.59551$ | $\nu_4 = 39.2$ |
| $r_8 =$ | 296.458 | $d_8 = 2.40$ | | |
| $r_9 =$ | −114.583 | $d_9 = 9.23$ | $n_5 = 1.69680$ | $\nu_5 = 55.5$ |
| $r_{10} =$ | −46.556 | | | |

$f_3 = 60.98$ total length of the lens: 39.86 value of the condition (1): 0.406 f value of the condition (2): 0.030 f value of the condition (3): 5.13  3.19

| Embodiment 4 | | | | |
|---|---|---|---|---|
| f = 150 | | F 4.5 | $2\omega = 56°$ | |
| $r_1 =$ | 49.814 | $d_1 = 9.99$ | $n_1 = 1.69680$ | $\nu_1 = 55.5$ |
| $r_2 =$ | 90.792 | $d_2 = 2.99$ | | |
| $r_3 =$ | −352.325 | $d_3 = 4.00$ | $n_2 = 1.59270$ | $\nu_2 = 35.3$ |
| $r_4 =$ | 48.764 | $d_4 = 2.86$ | | |
| $r_5 =$ | 80.000 | $d_5 = 10.00$ | $n_3 = 1.80610$ | $\nu_3 = 40.9$ |
| $r_6 =$ | −80.000 | $d_6 = 2.86$ | | |
| $r_7 =$ | −48.764 | $d_7 = 4.00$ | $n_4 = 1.59270$ | $\nu_4 = 35.3$ |
| $r_8 =$ | 352.325 | $d_8 = 2.99$ | | |
| $r_9 =$ | −90.792 | $d_9 = 9.99$ | $n_5 = 1.69680$ | $\nu_5 = 55.5$ |
| $r_{10} =$ | −49.814 | | | |

$f_3 = 51.05$ total length of the lens: 49.68
value of the condition (1): 0.340 f
value of the condition (2): 0.019 f
value of the condition (3): 5.20  3.19

| Embodiment 5 | | | | |
|---|---|---|---|---|
| f = 150 | | F 4.5 | $2\omega = 56°$ | |
| $r_1 =$ | 48.845 | $d_1 = 9.98$ | $n_1 = 1.71300$ | $\nu_1 = 53.9$ |
| $r_2 =$ | 132.597 | $d_2 = 2.31$ | | |
| $r_3 =$ | −342.627 | $d_3 = 2.95$ | $n_2 = 1.59551$ | $\nu_2 = 39.2$ |
| $r_4 =$ | 48.015 | $d_4 = 6.60$ | | |
| $r_5 =$ | 102.299 | $d_5 = 4.08$ | $n_3 = 1.74320$ | $\nu_3 = 49.4$ |
| $r_6 =$ | −102.299 | $d_6 = 6.60$ | | |
| $r_7 =$ | −48.015 | $d_7 = 2.95$ | $n_4 = 1.59551$ | $\nu_4 = 39.2$ |
| $r_8 =$ | 342.627 | $d_8 = 2.31$ | | |
| $r_9 =$ | −132.597 | $d_9 = 9.98$ | $n_5 = 1.71300$ | $\nu_5 = 53.9$ |
| $r_{10} =$ | −48.845 | | | |

$f_3 = 69.41$ total length of the lens: 47.76
value of the condition (1): 0.463 f
value of the condition (2): 0.044 f
value of the condition (3): 5.17  3.19

| Embodiment 6 | | | | |
|---|---|---|---|---|
| f = 150 | | F 4.5 | $2\omega = 56°$ | |
| $r_1 =$ | 43.999 | $d_1 = 8.21$ | $n_1 = 1.69680$ | $\nu_1 = 55.5$ |
| $r_2 =$ | 92.383 | $d_2 = 2.50$ | | |
| $r_3 =$ | −324.664 | $d_3 = 2.00$ | $n_2 = 1.59551$ | $\nu_2 = 39.2$ |
| $r_4 =$ | 44.322 | $d_4 = 3.49$ | | |
| $r_5 =$ | 80.000 | $d_5 = 3.72$ | $n_3 = 1.74400$ | $\nu_3 = 44.7$ |
| $r_6 =$ | −80.000 | $d_6 = 3.49$ | | |
| $r_7 =$ | −44.322 | $d_7 = 2.00$ | $n_4 = 1.59551$ | $\nu_4 = 39.2$ |
| $r_8 =$ | 324.664 | $d_8 = 2.50$ | | |
| $r_9 =$ | −92.383 | $d_9 = 8.21$ | $n_5 = 1.69680$ | $\nu_5 = 55.5$ |
| $r_{10} =$ | −43.999 | | | |

$f_3 = 54.30$ total length of the lens: 36.12
value of the condition (1): 0.362 f
value of the condition (2): 0.023 f
value of the condition (3):5.14  3.19

| Embodiment 7 | | | | |
|---|---|---|---|---|
| f = 150 | | F 4.5 | $2\omega = 56°$ | |
| $r_1 =$ | 42.980 | $d_1 = 6.92$ | $n_1 = 1.69350$ | $\nu_1 = 53.2$ |
| $r_2 =$ | 137.183 | $d_2 = 2.60$ | | |
| $r_3 =$ | −1047.028 | $d_3 = 2.17$ | $n_2 = 1.59551$ | $\nu_2 = 39.2$ |
| $r_4 =$ | 42.060 | $d_4 = 8.91$ | | |
| $r_5 =$ | 120.000 | $d_5 = 5.70$ | $n_3 = 1.71700$ | $\nu_3 = 47.9$ |
| $r_6 =$ | −120.000 | $d_6 = 8.91$ | | |
| $r_7 =$ | −42.060 | $d_7 = 2.17$ | $n_4 = 1.59551$ | $\nu_4 = 39.2$ |
| $r_8 =$ | 1047.028 | $d_8 = 2.60$ | | |
| $r_9 =$ | −137.183 | $d_9 = 6.92$ | $n_5 = 1.69350$ | $\nu_5 = 53.2$ |
| $r_{10} =$ | −42.980 | | | |

$f_3 = 84.52$ total length of the lens: 46.90
value of the condition (1): 0.563 f
value of the condition (2): 0.059 f
value of the condition (3): 5.10  3.19

| Embodiment 8 | | | | |
|---|---|---|---|---|
| f = 150 | | F 4.5 | $2\omega = 56°$ Y = 160 | |
| $r_1 =$ | 41.291 | $d_1 = 6.36$ | $n_1 = 1.65160$ | $\nu_1 = 58.6$ |
| $r_2 =$ | 116.153 | $d_2 = 2.40$ | | |
| $r_3 =$ | −290.421 | $d_3 = 1.90$ | $n_2 = 1.58144$ | $\nu_2 = 40.7$ |
| $r_4 =$ | 42.946 | $d_4 = 7.00$ | | |
| $r_5 =$ | 96.499 | $d_5 = 4.00$ | $n_3 = 1.74400$ | $\nu_3 = 44.7$ |
| $r_6 =$ | −96.499 | $d_6 = 7.00$ | | |
| $r_7 =$ | −42.946 | $d_7 = 1.90$ | $n_4 = 1.58144$ | $\nu_4 = 40.7$ |
| $r_8 =$ | 290.421 | $d_8 = 2.40$ | | |
| $r_9 =$ | −116.153 | $d_9 = 6.36$ | $n_5 = 1.65160$ | $\nu_5 = 58.6$ |
| $r_{10} =$ | −41.291 | | | |

$f_3 = 65.43$ total length of the lens: 39.32
value of the condition (1): 0.436 f
value of the condition (2): 0.047 f
value of the condition (3): 5.04  3.16

What is claimed is:

1. In a lens system of five groups of five lens elements in which a front group of two lens elements and a back group of two lens elements are symmetrically arranged with a biconvex lens installed therebetween in the center of the lens system, a copying lens characterised in that each of the lens elements is constituted in sequence from the object by the first lens of a positive meniscus lens with its convex surface directed toward the object, the second lens of a biconcave lens, the third lens of a biconvex lens, the fourth lens of a biconcave lens, and the fifth lens of a positive meniscus lens with its convex surface being directed toward the image and in which the condition $$0.2\ f < f_3 < 0.7\ f \tag{1}$$

where, f: overall focal length, $f_3$: focal length of the third lens,
and the condition $$0.01\ f < d_4\ \text{and}\ d_6 < 0.09\ f \quad (2)$$

where, $d_1, d_2, d_3, \ldots d_9$: thickness of the lenses and air gaps counted in sequence from the object, are fulfilled.

2. Copying lens as set forth in claim 1 constructed according to the constructional data given herebelow,

| $f = 150$ | | F 4.5 | | $2\omega = 56°$ | $Y = 160$ |
|---|---|---|---|---|---|
| $r_1 =$ | 42.701 | $d_1 =$ | 7.08 | $n_1 = 1.69680$ | $\nu_1 = 55.5$ |
| $r_2 =$ | 102.239 | $d_2 =$ | 2.50 | | |
| $r_3 =$ | −421.315 | $d_3 =$ | 2.00 | $n_2 = 1.59551$ | $\nu_2 = 39.2$ |
| $r_4 =$ | 43.423 | $d_4 =$ | 5.57 | | |
| $r_5 =$ | 93.836 | $d_5 =$ | 5.11 | $n_3 = 1.74400$ | $\nu_3 = 44.7$ |
| $r_6 =$ | −93.836 | $d_6 =$ | 5.57 | | |
| $r_7 =$ | −43.423 | $d_7 =$ | 2.00 | $n_4 = 1.59551$ | $\nu_4 = 39.2$ |
| $r_8 =$ | 421.315 | $d_8 =$ | 2.50 | | |
| $r_9 =$ | −102.239 | $d_9 =$ | 7.08 | $n_5 = 1.69680$ | $\nu_5 = 55.5$ |
| $r_{10} =$ | −42.701 | | | | |

$f_3 = 63.80$ total length of the lens: 39.41 value of the condition (1): 0.425 f value of the condition (2): 0.037 f value of the condition (3): 5.13  3.19 where, f: a composite focal length of the objective,
F: F number,
$2\omega$: field angle,
Y: image height,
$r_1, r_2, \ldots r_{10}$: a radius of curvature of lens surface counted in sequence from the object,
$d_1, d_2, \ldots d_9$: thickness of the lenses and air gaps counted in sequence from the object,
$n_1, n_2, \ldots n_5$: a refractive index with respect to a line d of the lens counted in sequence from the object.
$\nu_1, \nu_2, \ldots \nu_5$: Abbe number of the lens counted in sequence from the object.

3. Copying lens as set forth in claim 1 constructed according to the constructional data given herebelow,

| $f = 150$ | | F 4.5 | | $2\omega = 56°$ | |
|---|---|---|---|---|---|
| $r_1 =$ | .45.468 | $d_1 =$ | 6.75 | $n_1 = 1.69680$ | $\nu_1 = 55.5$ |
| $r_2 =$ | 139.884 | $d_2 =$ | 2.60 | | |
| $r_3 =$ | −297.525 | $d_3 =$ | 2.00 | $n_2 = 1.59551$ | $\nu_2 = 39.2$ |
| $r_4 =$ | 46.294 | $d_4 =$ | 10.00 | | |
| $r_5 =$ | 108.311 | $d_5 =$ | 5.93 | $n_3 = 1.74400$ | $\nu_3 = 44.7$ |
| $r_6 =$ | −108.311 | $d_6 =$ | 10.00 | | |
| $r_7 =$ | −46.294 | $d_7 =$ | 2.00 | $n_4 = 1.59551$ | $\nu_4 = 39.2$ |
| $r_8 =$ | 297.525 | $d_8 =$ | 2.60 | | |
| $r_9 =$ | −139.884 | $d_9 =$ | 6.75 | $n_5 = 1.69680$ | $\nu_5 = 55.5$ |
| $r_{10} =$ | −45.468 | | | | |

$f_3 = 73.65$ total length of the lens: 48.63 value of the condition (1): 0.491 f value of the condition (2): 0.066 f value of the condition (3): 5.13  3.19 where, f: a composite focal length of the objective,
F: F number,
$2\omega$: field angle,
Y: image height,
$r_1, r_2, \ldots r_{10}$: a radius of curvature of lens surface counted in sequence from the object,
$d_1, d_2, \ldots d_9$: thickness of the lenses and air gaps counted in sequence from the object,
$n_1, n_2, \ldots n_5$: a refractive index with respect to a line d of the lens counted in sequence from the object,
$\nu_1, \nu_2, \ldots \nu_5$: Abbe number of the lens counted in sequence from the object.

4. Copying lens as set forth in claim 1 constructed according to the constructional data given herebelow,

| $f = 150$ | | F 4.5 | | $2\omega = 56°$ | |
|---|---|---|---|---|---|
| $r_1 =$ | 46.556 | $d_1 =$ | 9.23 | $n_1 = 1.69680$ | $\nu_1 = 55.5$ |
| $r_2 =$ | 114.585 | $d_2 =$ | 2.40 | | |
| $r_3 =$ | −296.458 | $d_3 =$ | 2.00 | $n_2 = 1.59551$ | $\nu_2 = 39.2$ |
| $r_4 =$ | 46.524 | $d_4 =$ | 4.50 | | |
| $r_5 =$ | 89.963 | $d_5 =$ | 3.60 | $n_3 = 1.74400$ | $\nu_3 = 44.7$ |
| $r_6 =$ | −89.963 | $d_6 =$ | 4.50 | | |
| $r_7 =$ | −46.524 | $d_7 =$ | 2.00 | $n_4 = 1.59551$ | $\nu_4 = 39.2$ |
| $r_8 =$ | 296.458 | $d_8 =$ | 2.40 | | |
| $r_9 =$ | −114.583 | $d_9 =$ | 9.23 | $n_5 = 1.69680$ | $\nu_5 = 55.5$ |
| $r_{10} =$ | −46.556 | | | | |

$f_3 = 60.98$ total length of the lens: 39.86 value of the condition (1): 0.406 f value of the condition (2): 0.030 f value of the condition (3): 5.13  3.19 where, f: a composite focal length of the objective,
F: F number,
$2\omega$: field angle,
Y: image height,
$r_1, r_2, \ldots r_{10}$: a radius of curvature of lens surface counted in sequence from the object,
$d_1, d_2, \ldots d_9$: a thickness of lenses and air gaps counted in sequence from the object,
$n_1, n_2, \ldots n_5$: a refractive index with respect to a line d of the lens counted in sequence from the object,
$\nu_1, \nu_2, \ldots \nu_5$: Abbe number of the lens counted in sequence from the object.

5. Copying lens as set forth in claim 1 constructed according to the constructional data given herebelow,

| $f = 150$ | | F 4.5 | | $2\omega = 56°$ | |
|---|---|---|---|---|---|
| $r_1 =$ | 49.814 | $d_1 =$ | 9.99 | $n_1 = 1.69680$ | $\nu_1 = 55.5$ |
| $r_2 =$ | 90.792 | $d_2 =$ | 2.99 | | |
| $r_3 =$ | −352.325 | $d_3 =$ | 4.00 | $n_2 = 1.59270$ | $\nu_2 = 35.3$ |
| $r_4 =$ | 48.764 | $d_4 =$ | 2.86 | | |
| $r_5 =$ | 80.000 | $d_5 =$ | 10.00 | $n_3 = 1.80610$ | $\nu_3 = 40.9$ |
| $r_6 =$ | −80.000 | $d_6 =$ | 2.86 | | |
| $r_7 =$ | −48.764 | $d_7 =$ | 4.00 | $n_4 = 1.59270$ | $\nu_4 = 35.3$ |
| $r_8 =$ | 352.325 | $d_8 =$ | 2.99 | | |
| $r_9 =$ | −90.792 | $d_9 =$ | 9.99 | $n_5 = 1.69680$ | $\nu_5 = 55.5$ |
| $r_{10} =$ | −49.814 | | | | |

$f_3 = 51.05$ total length of the lens: 49.68 value of the condition (1): 0.340 f value of the condition (2): 0.019 f value of the condition (3): 5.20  3.19 where, f: a composite focal length of the objective,
F: F number,
$2\omega$: field angle,
Y: image height,
$r_1, r_2, \ldots r_{10}$: a radius of curvature of lens surface counted in sequence from the object,
$d_1, d_2, \ldots d_9$: a thickness of the lenses and air gaps counted in sequence from the object,
$n_1, n_2, \ldots n_5$: a refractive index with respect to a line d of the lens counted in sequence from the object,
$\nu_1, \nu_2, \ldots \nu_5$: Abbe number of the lens counted in sequence from the object.

6. Copying lens as set forth in claim 1 constructed according to the constructional data given herebelow,

| $f = 150$ | | F 4.5 | | $2\omega = 56°$ | |
|---|---|---|---|---|---|
| $r_1 =$ | 48.845 | $d_1 =$ | 9.98 | $n_1 = 1.71300$ | $\nu_1 = 53.9$ |
| $r_2 =$ | 132.597 | $d_2 =$ | 2.31 | | |
| $r_3 =$ | −342.627 | $d_3 =$ | 2.95 | $n_2 = 1.59551$ | $\nu_2 = 39.2$ |
| $r_4 =$ | 48.015 | $d_4 =$ | 6.60 | | |
| $r_5 =$ | 102.299 | $d_5 =$ | 4.08 | $n_3 = 1.74320$ | $\nu_3 = 49.4$ |
| $r_6 =$ | −102.299 | $d_6 =$ | 6.60 | | |

-continued

| f = 150 | | F 4.5 | | 2ω = 56° | |
|---|---|---|---|---|---|
| $r_7$ = | −48.015 | $d_7$ = 2.95 | $n_4$ = 1.59551 | $\nu_4$ = 39.2 |
| $r_8$ = | 342.627 | $d_8$ = 2.31 | | |
| $r_9$ = | −132.597 | $d_9$ = 9.98 | $n_5$ = 1.71300 | $\nu_5$ = 53.9 |
| $r_{10}$ = | −48.845 | | | |

$f_3$ = 69.41 total length of the lens: 47.76 value of the condition (1): 0.463 f value of the condition (2): 0.044 f value of the condition (3): 5.17  3.19 where,
 f: a composite focal length of the objective,
 F: F number,
 2ω: field angle,
 Y: image height,
 $r_1, r_2, \ldots r_{10}$: a radius of curvature of lens surface counted in sequence from the object,
 $d_1, d_2, \ldots d_9$: a thickness of the lenses and air gaps counted in sequence from the object,
 $n_1, n_2, \ldots n_5$: a refractive index with respect to a line d of the lens counted in sequence from the object,
 $\nu_1, \nu_2, \ldots \nu_5$: Abbe number of the lens counted in sequence from the object.

7. Copying lens as set forth in claim 1 constructed according to the constructional data given herebelow,

| f = 150 | | F 4.5 | | 2ω = 56° | |
|---|---|---|---|---|---|
| $r_1$ = | 43.999 | $d_1$ = 8.21 | $n_1$ = 1.69680 | $\nu_1$ = 55.5 |
| $r_2$ = | 92.383 | $d_2$ = 2.50 | | |
| $r_3$ = | −324.664 | $d_3$ = 2.00 | $n_2$ = 1.59551 | $\nu_2$ = 39.2 |
| $r_4$ = | 44.322 | $d_4$ = 3.49 | | |
| $r_5$ = | 80.000 | $d_5$ = 3.72 | $n_3$ = 1.74400 | $\nu_3$ = 44.7 |
| $r_6$ = | −80.000 | $d_6$ = 3.49 | | |
| $r_7$ = | −44.322 | $d_7$ = 2.00 | $n_4$ = 1.59551 | $\nu_4$ = 39.2 |
| $r_8$ = | 324.664 | $d_8$ = 2.50 | | |
| $r_9$ = | −92.383 | $d_9$ = 8.21 | $n_5$ = 1.69680 | $\nu_5$ = 55.5 |
| $r_{10}$ = | −43.999 | | | |

$f_3$ = 54.30 total length of the lens: 36.12 value of the condition (1): 0.362 f value of the condition (2): 0.023 f value of the condition (3): 5.14  3.19 where,
 f: a composite focal length of the objective,
 F: F number,
 2ω: field angle,
 Y: image height,
 $r_1, r_2, \ldots r_{10}$: a radius of curvature of lens surface counted in sequence from the object,
 $d_1, d_2, \ldots d_9$: a thickness of the lenses and air gaps counted in sequence from the object,
 $n_1, n_2, \ldots n_5$: a refractive index with respect to a line d of the lens counted in sequence from the object,
 $\nu_1, \nu_2, \ldots \nu_5$: Abbe number of the lens counted in sequence from the object.

8. Copying lens as set forth in claim 1 constructed according to the constructional data given herebelow,

| f = 150 | | F 4.5 | | 2ω = 56° | |
|---|---|---|---|---|---|
| $r_1$ = | 42.980 | $d_1$ = 6.92 | $n_1$ = 1.69350 | $\nu_1$ = 53.2 |
| $r_2$ = | 137.183 | $d_2$ = 2.60 | | |
| $r_3$ = | −1047.028 | $d_3$ = 2.17 | $n_2$ = 1.59551 | $\nu_2$ = 39.2 |
| $r_4$ = | 42.060 | $d_4$ = 8.91 | | |
| $r_5$ = | 120.000 | $d_5$ = 5.70 | $n_3$ = 1.71700 | $\nu_3$ = 47.9 |
| $r_6$ = | −120.000 | $d_6$ = 8.91 | | |
| $r_7$ = | −42.060 | $d_7$ = 2.17 | $n_4$ = 1.59551 | $\nu_4$ = 39.2 |
| $r_8$ = | 1047.028 | $d_8$ = 2.60 | | |
| $r_9$ = | −137.183 | $d_9$ = 6.92 | $n_5$ = 1.69350 | $\nu_5$ = 53.2 |
| $r_{10}$ = | −42.980 | | | |

$f_3$ = 84.52 total length of the lens: 46.90 value of the condition (1): 0.563 f value of the condition (2): 0.059 f value of the condition (3): 5.10  3.19 where,
 f: a composite focal length of the objective,
 F: F number,
 2ω: field angle,
 Y: image height,
 $r_1, r_2, \ldots r_{10}$: a radius of curvature of lens surface counted in sequence from the object,
 $d_1, d_2, \ldots d_9$: a thickness of the lenses and air gaps counted in sequence from the object,
 $n_1, n_2, \ldots n_5$: a refractive index with respect to a line d of the lens counted in sequence from the object,
 $\nu_1, \nu_2, \ldots \nu_5$: Abbe number of the lens counted in sequence from the object.

9. Copying lens as set forth in claim 1 constructed according to the constructional data given herebelow,

| f = 150 | | F 4.5 | | 2ω = 56° | | Y = 160 |
|---|---|---|---|---|---|---|
| $r_1$ = | 41.291 | $d_1$ = 6.36 | $n_1$ = 1.65160 | $\nu_1$ = 58.6 |
| $r_2$ = | 116.153 | $d_2$ = 2.40 | | |
| $r_3$ = | −290.421 | $d_3$ = 1.90 | $n_2$ = 1.58144 | $\nu_2$ = 40.7 |
| $r_4$ = | 42.946 | $d_4$ = 7.00 | | |
| $r_5$ = | 96.499 | $d_5$ = 4.00 | $n_3$ = 1.74400 | $\nu_3$ = 44.7 |
| $r_6$ = | −96.499 | $d_6$ = 7.00 | | |
| $r_7$ = | −42.946 | $d_7$ = 1.90 | $n_4$ = 1.58144 | $\nu_4$ = 40.7 |
| $r_8$ = | 290.421 | $d_8$ = 2.40 | | |
| $r_9$ = | −116.153 | $d_9$ = 6.36 | $n_5$ = 1.65160 | $\nu_5$ = 58.6 |
| $r_{10}$ = | −41.291 | | | |

$f_3$ = 65.43 total length of the lens: 39.32
value of the condition (1): 0.436 f
value of the condition (2): 0.047 f
value of the condition (3): 5.04  3.16 where,
 f: a composite focal length of the objective,
 F: F number,
 2ω: field angle,
 Y: image height,
 $r_1, r_2, \ldots r_{10}$: a radius of curvature of lens surface counted in sequence from the object,
 $d_1, d_2, \ldots d_9$: a thickness of the lenses and air gaps counted in sequence from the object,
 $n_1, n_2, \ldots n_5$: a refractive index with respect to a line d of the lens counted in sequence from the object,
 $\nu_1, \nu_2, \ldots \nu_5$: Abbe number of the lens counted in sequence from the object.

* * * * *

UNITED STATES PATENT AND TRADEMARK OFFICE
CERTIFICATE OF CORRECTION

PATENT NO. : 4,173,396
DATED : November 6, 1979
INVENTOR(S) : MINORU YOKOTA

It is certified that error appears in the above—identified patent and that said Letters Patent is hereby corrected as shown below:

Column 1, line 28, after "diameter" insert -- lens --.

Column 2, line 4, "of" should read -- to the --;

Column 2, line 17, "1mm," should read -- mm, --.

Column 3, line 11, delete "the" (second occurrence);

Column 3, line 12, "make" should read -- provide --

Column 3, line 12, "balance in" should read -- balancing of --;

Column 3, line 33, delete "in";

Column 3, line 56, "and" should read -- or --.

UNITED STATES PATENT AND TRADEMARK OFFICE
CERTIFICATE OF CORRECTION

PATENT NO. : 4,173,396

DATED : November 6, 1979

INVENTOR(S) : MINORU YOKOTA

It is certified that error appears in the above—identified patent and that said Letters Patent is hereby corrected as shown below:

Column 5, lines 15 and 16 should read -- When the image surface is returned to an under corrected condition by changing the radius of curvature, --.

Column 7, line 15, "0.66f" should read -- 0.066f --

Column 8, line 55, "characterised" should read -- characterized --.

Column 11, line 21, "referactive" should read -- refractive --.

Signed and Sealed this

Tenth Day of June 1980

[SEAL]

Attest:

SIDNEY A. DIAMOND

Attesting Officer

Commissioner of Patents and Trademark